US010066512B2

(12) United States Patent
Geskes et al.

(10) Patent No.: US 10,066,512 B2
(45) Date of Patent: Sep. 4, 2018

(54) SYSTEM FOR USING THE WASTE HEAT OF AN INTERNAL COMBUSTION ENGINE

(75) Inventors: Peter Geskes, Ostfildern (DE); Klaus Irmler, Tübingen (DE); Eberhard Pantow, Winnenden (DE); Michael Schmidt, Bietigheim-Bissingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 585 days.

(21) Appl. No.: 13/809,991

(22) PCT Filed: May 24, 2011

(86) PCT No.: PCT/EP2011/058470
§ 371 (c)(1),
(2), (4) Date: Apr. 26, 2013

(87) PCT Pub. No.: WO2012/010349
PCT Pub. Date: Jan. 26, 2012

(65) Prior Publication Data
US 2016/0153317 A1    Jun. 2, 2016

(30) Foreign Application Priority Data
Jul. 20, 2010   (DE) ........................ 10 2010 031 561

(51) Int. Cl.
*F01K 23/10*    (2006.01)
*F01K 23/06*    (2006.01)
(Continued)

(52) U.S. Cl.
CPC ............ *F01K 23/10* (2013.01); *F01K 23/065* (2013.01); *F02B 47/08* (2013.01); *F02G 5/02* (2013.01);
(Continued)

(58) Field of Classification Search
CPC .... F01K 23/10; F01B 39/024; F01N 2240/02; F02G 1/043; F02G 1/055; F02G 1/053
(Continued)

(56) References Cited

U.S. PATENT DOCUMENTS 4,334,409 A * 6/1982 Daugas ................. F01K 23/065
60/618
4,901,531 A * 2/1990 Kubo .................... F01K 23/065
60/618
(Continued)

FOREIGN PATENT DOCUMENTS

DE    197 19 252 A1    11/1998
DE    103 12 788 A1     9/2004
(Continued)

OTHER PUBLICATIONS

International Search Report, PCT/EP2011/058470, dated Dec. 8, 2011, 3 pgs.
(Continued)

*Primary Examiner* — Thai Ba Trieu
*Assistant Examiner* — Loren Edwards
(74) *Attorney, Agent, or Firm* — Paul D. Strain, Esq.; Strain & Strain PLLC

(57) ABSTRACT

The application relates to a system for using the waste heat of an internal combustion engine through the Clausius-Rankine cycle. Such system prevents operating medium from the Clausius-Rankine cycle from leaking into combustion air or exhaust air. The system has a first flow channel formed by at least one first limiting component and a second flow channel formed by at least one second limiting component. The system has a fluid-conducting connection to the surroundings or to a receiving chamber from the first limiting component and preferably from the second limiting component, so that in the event of a leak the operating (Continued)

Figure 1:
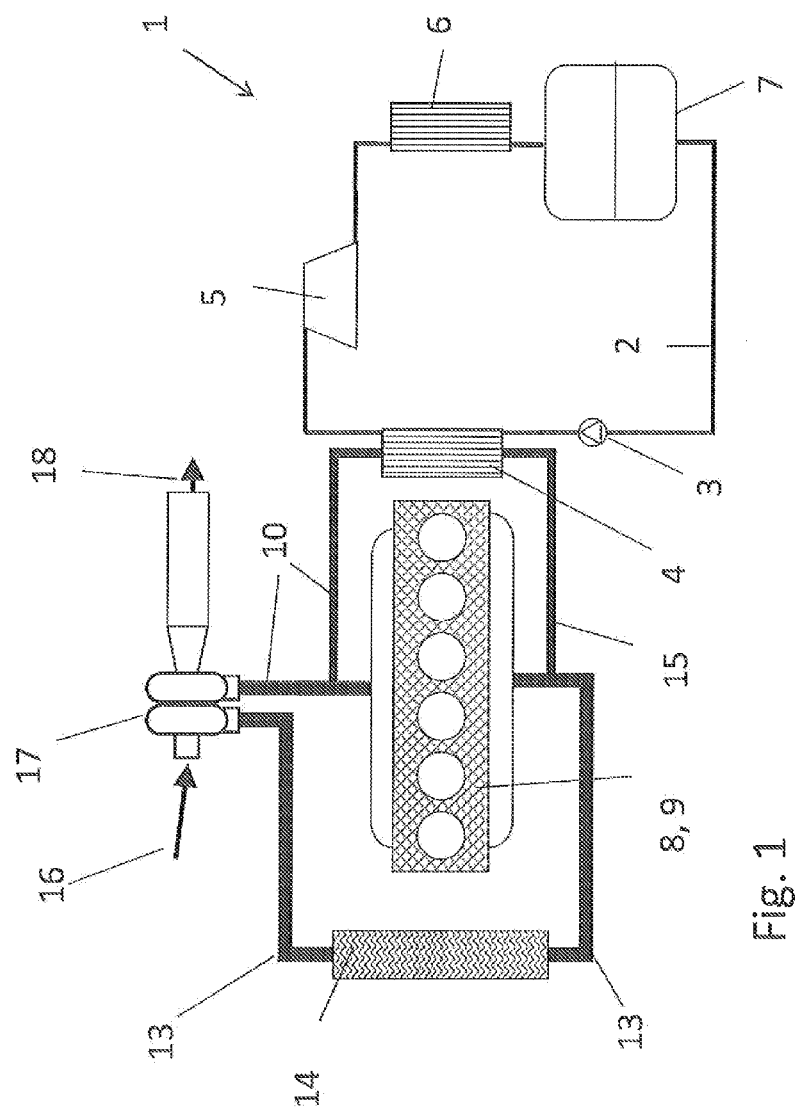

medium is conducted into the surroundings or into the receiving chamber.

14 Claims, 9 Drawing Sheets

(51) Int. Cl.
| | |
|---|---|
| *F02B 47/08* | (2006.01) |
| *F02G 5/02* | (2006.01) |
| *F22B 1/18* | (2006.01) |
| *F28D 7/00* | (2006.01) |
| *F28D 9/00* | (2006.01) |
| *F28F 3/00* | (2006.01) |
| *F02M 26/28* | (2016.01) |
| *F25B 39/02* | (2006.01) |

(52) U.S. Cl.
CPC .......... *F02M 26/28* (2016.02); *F22B 1/1807* (2013.01); *F25B 39/024* (2013.01); *F28D 7/0025* (2013.01); *F28D 9/0043* (2013.01); *F28F 3/005* (2013.01); *F28F 2265/16* (2013.01); *Y02E 20/363* (2013.01); *Y02T 10/121* (2013.01); *Y02T 10/166* (2013.01)

(58) Field of Classification Search
USPC .......................................................... 60/620
See application file for complete search history.

(56) References Cited

U.S. PATENT DOCUMENTS

| | | | |
|---|---|---|---|
| 5,584,341 A | 12/1996 | Sabin et al. | |
| 6,161,616 A | 12/2000 | Haussmann | |
| 7,669,645 B2 | 3/2010 | Nakamura | |
| 7,703,506 B2* | 4/2010 | Brost .................. | F02M 31/042 |
| | | | 165/157 |
| 7,721,543 B2* | 5/2010 | Massey ................ | F01P 9/02 |
| | | | 60/618 |
| 2002/0162651 A1 | 11/2002 | Nakagome et al. | |
| 2008/0202724 A1 | 8/2008 | Lorenz et al. | |
| 2010/0146974 A1 | 6/2010 | Ast et al. | |
| 2011/0226445 A1* | 9/2011 | Brand .................. | F28F 3/12 |
| | | | 165/70 |
| 2012/0060502 A1 | 3/2012 | Gärtner et al. | |
| 2012/0090321 A1 | 4/2012 | Gärtner et al. | |
| 2012/0180452 A1* | 7/2012 | Caine .................. | B60H 1/025 |
| | | | 60/273 |

FOREIGN PATENT DOCUMENTS

| | | |
|---|---|---|
| DE | 10 2008 004 903 A1 | 7/2009 |
| DE | 10 2008 057 202 A1 | 5/2010 |
| DE | 10 2009 020 615 A1 | 11/2010 |
| EP | 1 586 845 A1 | 10/2005 |
| WO | WO 96/41995 A1 | 12/1996 |
| WO | WO 2009/089885 A1 | 7/2009 |

OTHER PUBLICATIONS

German Search Report, DE 10 2010 031 561.3, dated Mar. 1, 2011, 4 pgs.

* cited by examiner

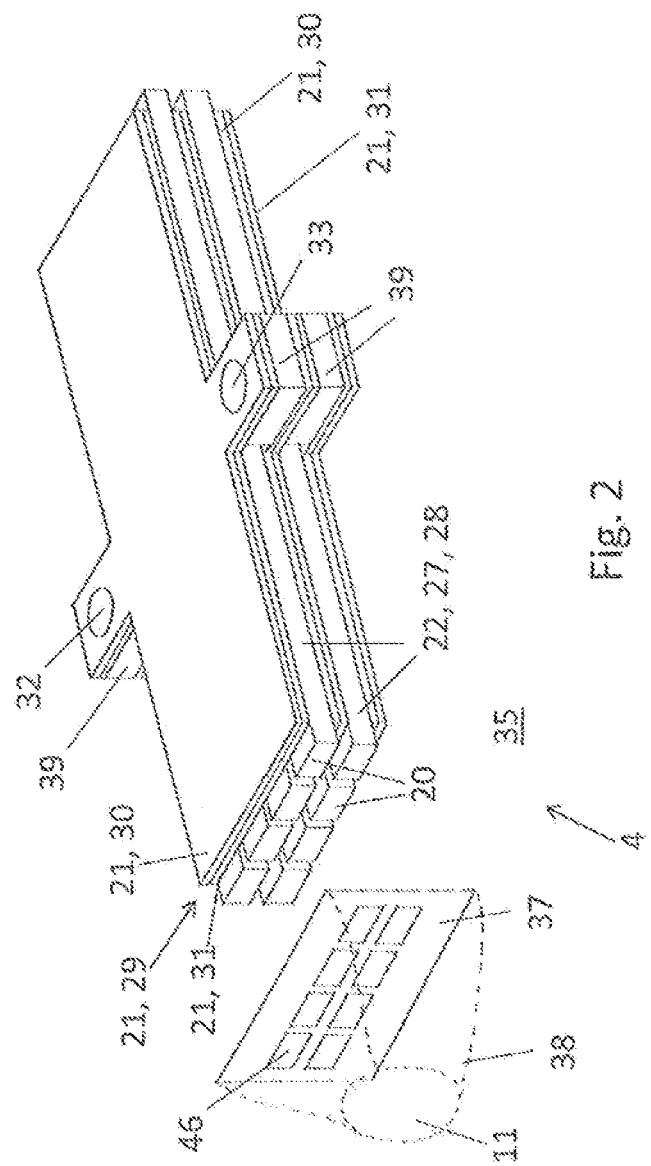

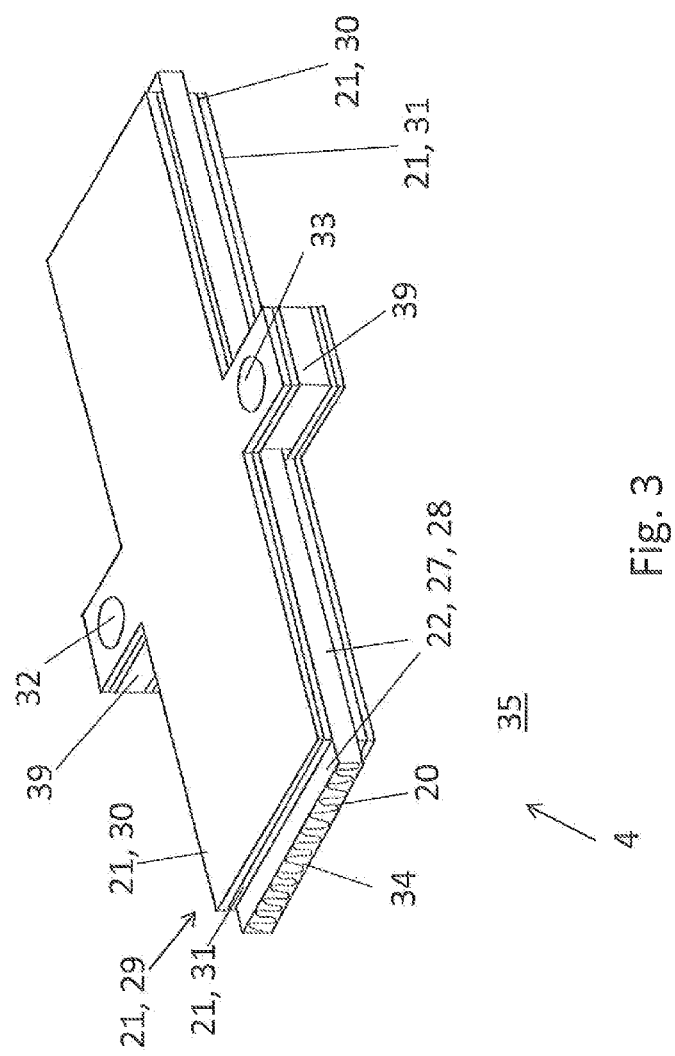

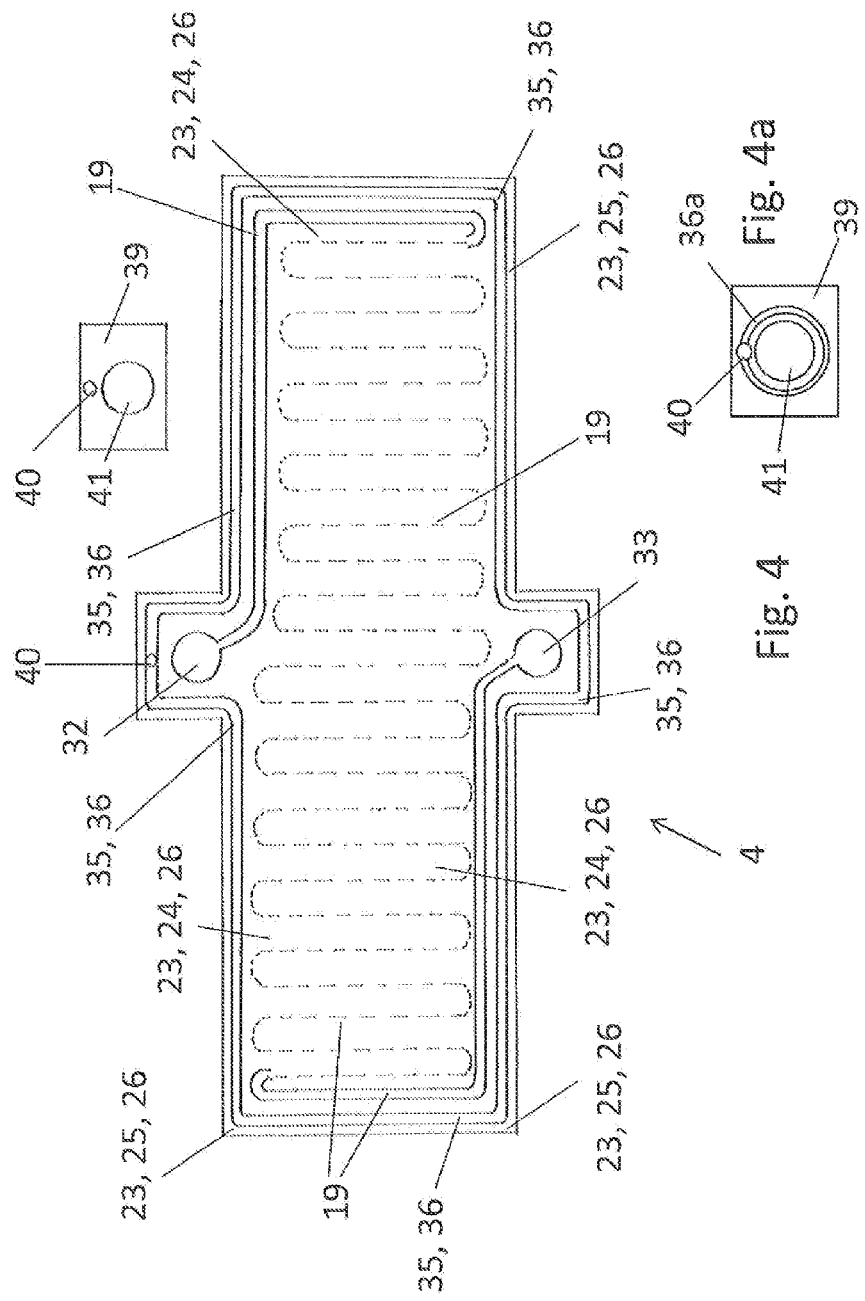

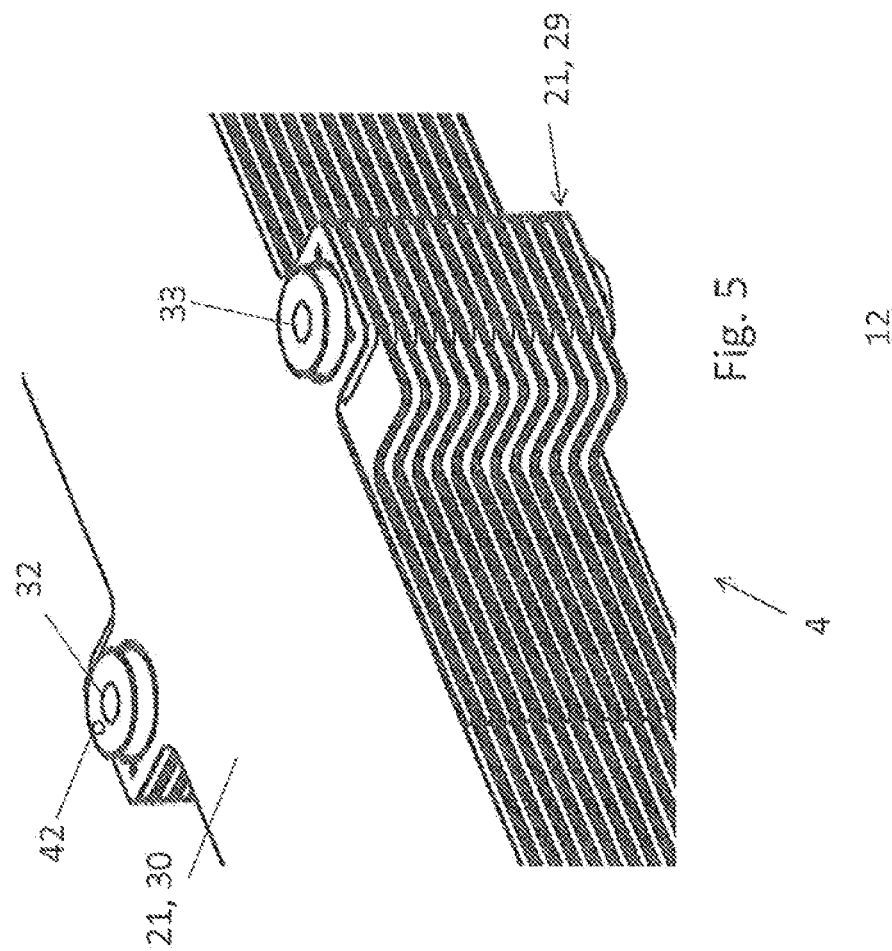

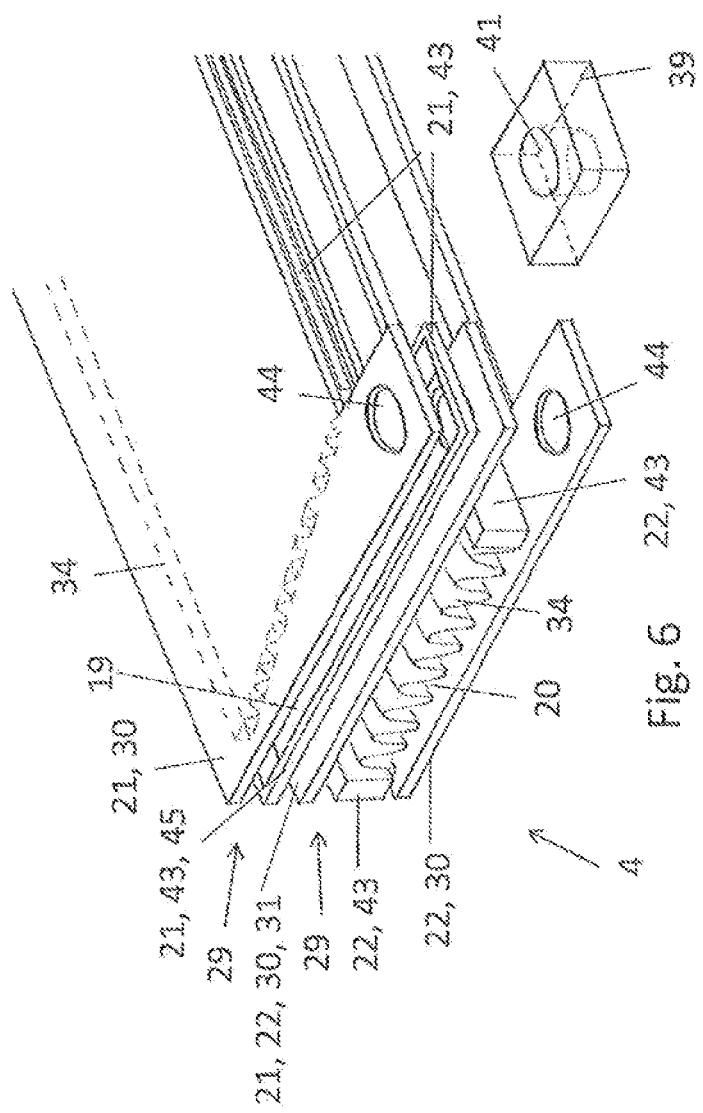

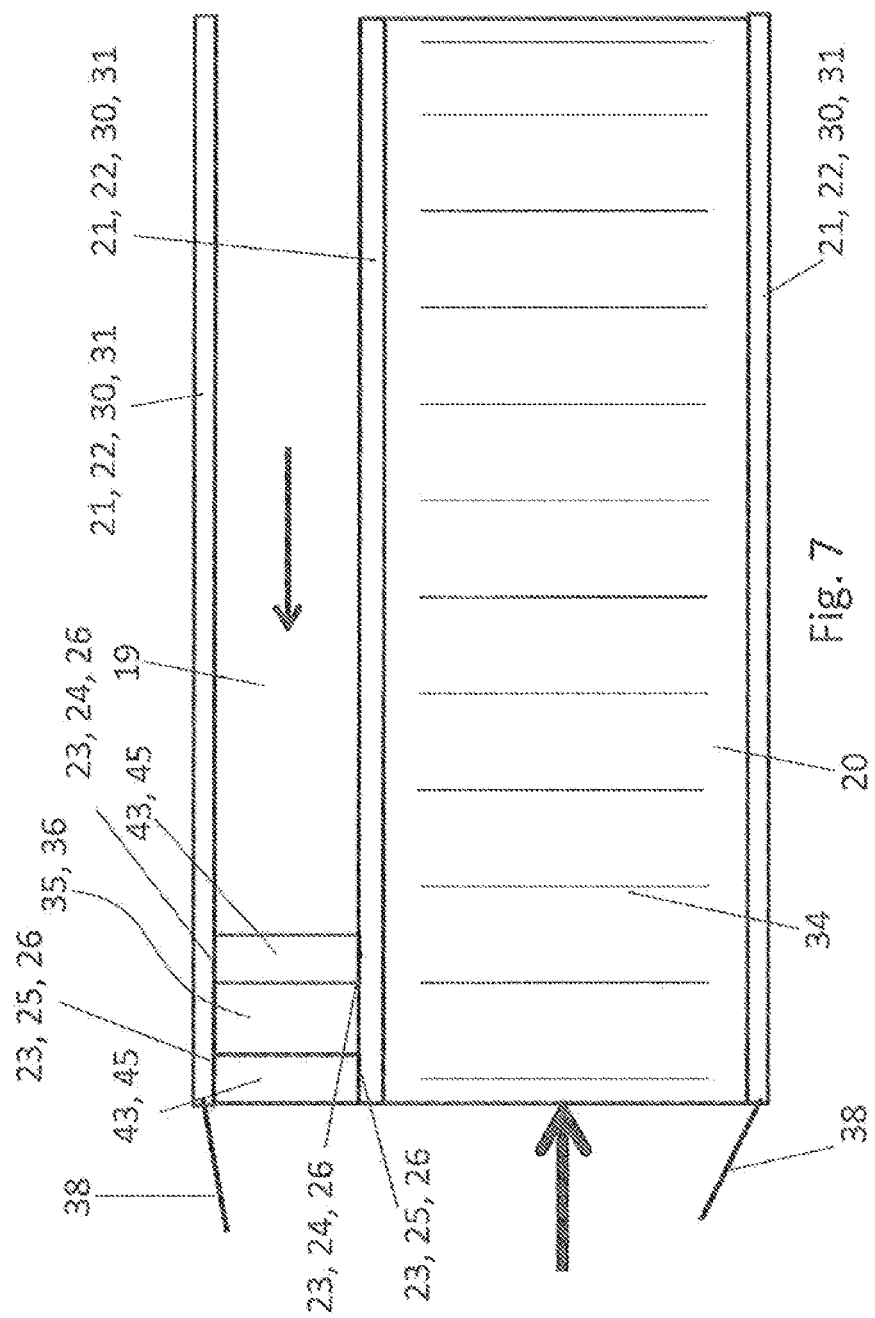

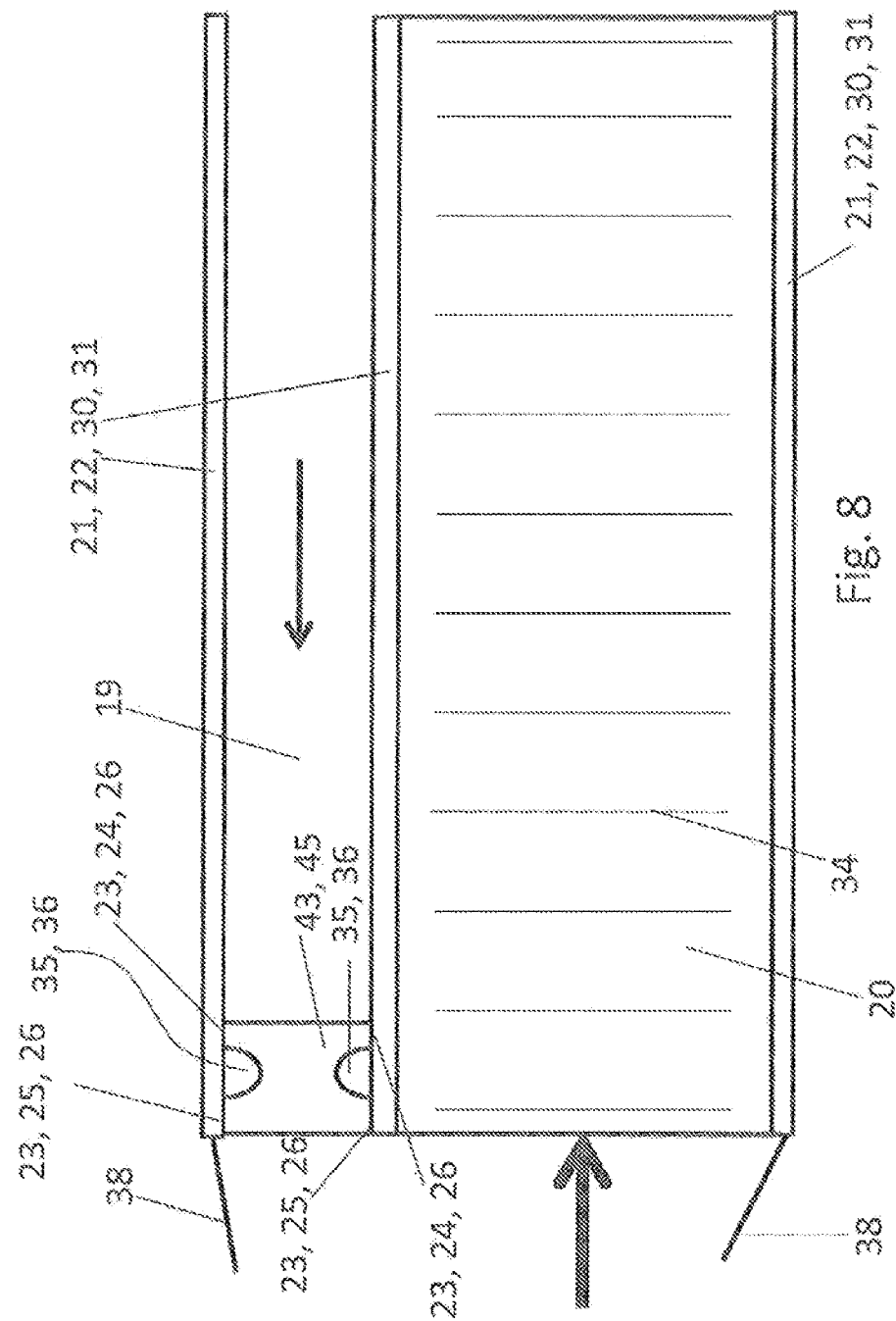

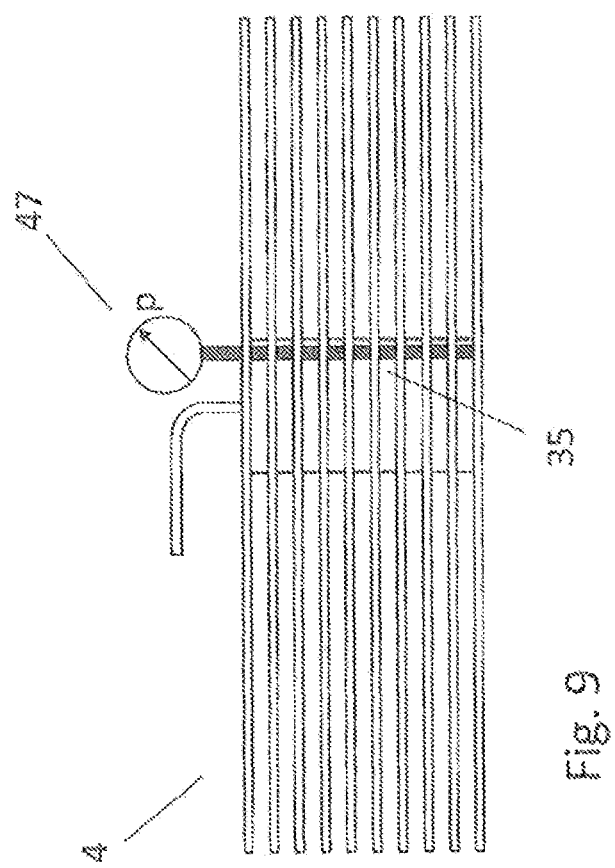

SYSTEM FOR USING THE WASTE HEAT OF AN INTERNAL COMBUSTION ENGINE

CROSS-REFERENCE TO RELATED PATENT APPLICATIONS

This application is a National Stage of International Application No. PCT/EP2011/058470, filed May 24, 2011, which is based upon and claims the benefit of priority from prior German Patent Application No. 10 2010 031 561.3, filed Jul. 20, 2010, the entire contents of all of which are incorporated herein by reference in their entirety.

The invention relates to system for using the waste heat of an internal combustion engine by means of the Clausius-Rankine cycle according to the preamble of claim 1 and to an internal combustion engine with a system for using the waste heat of the internal combustion engine by means of the Clausius-Rankine cycle according to the preamble of claim 11.

Internal combustion engines are used in various technical applications for converting heat energy into mechanical energy. In motor vehicles, in particular trucks, internal combustion engines are used to move the motor vehicle. The efficiency of internal combustion engines can be enhanced by the use of systems for using the waste heat of the internal combustion engine by means of the Clausius-Rankine cycle. In this case, the system converts the waste heat of the internal combustion engine into mechanical energy. The system comprises a circuit having lines with a working medium, for example water or an organic refrigerant, such as R245fa, a pump for conveying the working medium, an evaporator heat exchanger for evaporating the liquid working medium, an expansion machine, a condenser for liquefying the vaporous working medium, and a collecting and equalizing container for the liquid working medium. The use of systems of this type in an internal combustion engine makes it possible, in the case of an internal combustion engine having a system of this type as part of the internal combustion engine, for the overall efficiency of the internal combustion engine to be enhanced.

In the evaporator heat exchanger, the working medium is evaporated by the waste heat of the internal combustion engine, and the evaporated working medium is subsequently supplied to the expansion machine, in which the gaseous working medium expands by means of the expansion machine and performs mechanical work. In the evaporator heat exchanger the working medium is conducted, for example, by a flow channel and exhaust gas of the internal combustion engine is conducted by an exhaust gas flow channel. As a result, the heat from the exhaust gas is transmitted at a temperature within the range of, for example, between 400° C. and 600° C., to the working medium in the evaporator heat exchanger and the working medium is thereby transferred from the liquid state of aggregation into the vaporous state of aggregation. In this case, the exhaust gas conducted through the evaporator can subsequently be supplied again by an exhaust gas recirculation line to a charge air line of the internal combustion engine such that, in the event of leakiness within the evaporator heat exchanger, the working medium is admixed with the combustion air supplied to the internal combustion engine and is therefore supplied to the internal combustion engine. This applies analogously if the evaporator heat exchanger is designed as a charge air cooler and the working medium is heated by the compressed charge air.

In the event of use of an organic working medium, for example R245FA, or, in the case of ethanol and leakiness in the evaporator heat exchanger, the working medium enters the combustion air and, during the combustion of the working medium in the combustion chamber of the internal combustion engine, toxic gases, for example hydrogen fluoride, occur. These toxic gases, in particular hydrogen fluoride, are subsequently conducted into the surroundings of the motor vehicle in the form of exhaust gas where they can cause environmental damage or else damage to the health of individuals in the vicinity of the motor vehicle.

WO 2009/089885 A1 shows a device for exchanging heat between a first and a second medium, with pairs of disks stacked one on another in a stacking direction, wherein a first flow space, through which a first medium can flow, is formed between the two disks of at least one pair of disks, and a second flow space, through which a second medium can flow, is formed between two mutually adjacent pairs of disks, wherein the first flow space has a first flow path having flow path sections for the first medium, through which sections the flow can pass successively in opposite directions and which are separated from one another by a partition arranged between the at least two disks of the at least one pair of disks.

It is therefore the object of the present invention to provide a system for using the waste heat of an internal combustion engine by means of the Clausius-Rankine cycle and an internal combustion engine with a system for using the waste heat of the internal combustion engine by means of the Clausius-Rankine cycle, in which the working medium is substantially prevented from entering the combustion air supplied to the internal combustion engine due to leakiness or a leakage at the evaporator heat exchanger.

This object is achieved by a system for using the waste heat of an internal combustion engine by means of the Clausius-Rankine cycle, comprising a circuit having lines with a working medium, in particular water, a pump for conveying the working medium, an evaporator heat exchanger for evaporating the liquid working medium having at least one first flow channel for the passage of the working medium and at least one second flow channel for the passage of a fluid, for example charge air or exhaust gas, for transferring heat from the fluid to the working medium, an expansion machine, a condenser for liquefying the vaporous working medium, and preferably a collecting and equalizing container for the liquid working medium, wherein the at least first flow channel is formed by at least one first limiting component and the at least one second flow channel is formed by at least one second limiting component, and there is a fluid-conducting connection from the at least one first limiting component and preferably from the at least one second limiting component into the surroundings or into a receiving space such that, in the event of a leakage at the at least one first limiting component, the working medium can be conducted into the surroundings or into the receiving space and, preferably, in the event of a leakage at the at least one second limiting component, the fluid can be conducted into the surroundings or into the receiving space.

The at least one first and/or second limiting component constitutes, for example, a component, for example a pipe wall or a disk wall and, in addition, may also be formed by an integrally bonded connection, in particular a brazed joint. The flow channel is formed by means of the at least one limiting component by the limiting component bounding and/or forming the flow space. In this case, there is a fluid-conducting connection, for example integrally bonded connection or brazed joint, from the at least one limiting component, in particular only one first limiting component, into the surroundings or into the receiving space or into the flow space. This preferably also applies analogously to the second limiting component, in particular only one second limiting component. As a result, there is no direct fluid-conducting connection, for example integrally bonded connection or brazed joint, between the at least one first limiting component, in particular only one first limiting component, and the at least one second limiting component, in particular only one second limiting component, because of the working space arranged in-between or the fluid-conducting connection into the surroundings. For example, in the event of a leakage at a first limiting component, for example a brazed joint, the working medium from the first flow space does not enter the second flow space, but rather the flow space, and therefore, as a result, the working medium located in the first flow space is not conducted into the second flow space with the exhaust gas or the charge air. This also applies analogously to a leakage at a second limiting component.

In an additional refinement, the receiving space is designed as a closed receiving space and is provided with a sensor, for example a pressure sensor. In the event of a leakage at the at least one first limiting component and/or at the at least one second limiting component, the working medium or the charge air or the exhaust gas enters the receiving space, and therefore the pressure can be increased in the receiving space and, as a result, the increased pressure can be detected by the pressure sensor. Leakage at the evaporator heat exchanger can therefore be detected by the system because of the pressure sensor and therefore the system to an internal combustion engine can be switched off by a control unit in order to avoid working medium being conducted into the combustion air of the internal combustion engine.

In an additional refinement, the flow space, in particular receiving space, is provided with a sensor for detecting the working medium or charge air or exhaust gas. If, in an analogous manner, a leakage occurs at the first limiting component and/or at the second limiting component, the conducting of the working medium and/or of charge air or exhaust gas into the flow space is detected by the sensor and the system is switched off by a control unit of the internal combustion engine.

In particular, the at least one first flow channel and the at least one second flow channel are separated from each other by the at least one first and second limiting components such that, in the event of a leakage at the at least one first limiting component, the working medium does not enter the at least one second flow channel and/or, in the event of a leakage at the at least one second limiting component, the fluid does not enter the at least one first flow channel, and/or the at least one first limiting component comprises an or at least one integrally bonded connection, in particular brazed joint, and the integrally bonded connection to the surroundings or to the receiving space has a fluid-conducting connection such that, in the event of leakiness of the integrally bonded connection, the working medium can be conducted, in particular completely, out of the first flow channel into the surroundings or to the receiving space and/or the at least one second limiting component comprises an integrally bonded connection, in particular brazed joint, and the integrally bonded connection to the surroundings or to the receiving space has a fluid-conducting connection such that, in the event of leakiness of the integrally bonded connection, the fluid can be conducted, in particular completely, out of the second flow channel into the surroundings or to the receiving space. If the at least one first/second limiting component comprises an integrally bonded connection, these may also be a plurality of integrally bonded connections.

In a further refinement, the at least one first limiting component comprises at least one pipe wall and/or a frame and/or at least one double disk wall and/or a fluid-tight integrally bonded connection, for example brazed joint, preferably between the double disk walls, and the first flow channel is formed in particular between the double disk walls or within the at least one pipe wall.

In a supplementary embodiment, the at least one second limiting component comprises at least one pipe wall and/or a frame and/or at least one double disk wall and/or a fluid-tight integrally bonded connection, for example brazed joint, preferably between the double disk walls, and the second flow channel is formed in particular between the double disk walls or within the at least one pipe wall.

A ribbed structure or a turbulence insert is preferably arranged between the double disk walls. The ribbed structure serves, for example, to provide a distance between an upper and a lower disk wall.

In an additional refinement, a ribbed structure is not inserted between the double disk walls, and a channel or two channels is or are incorporated, for example by means of milling, in a disk wall of the double disk wall such that, as a result, a first and/or a second flow channel is/are formed between the double disk walls.

In a variant embodiment, the at least one first flow channel and the at least one second flow channel are separated from each other by two walls and the two walls are preferably connected to each other by an integrally bonded connection, for example brazed joint.

Expediently, the at least one first flow channel is formed with at least one first integrally bonded connection, in particular brazed joint, and the at least one second flow channel is formed with at least one second integrally bonded connection, in particular brazed joint, and a flow space, in particular leakage channel, is formed between the first and second integrally bonded connections, and the flow space has a fluid-conducting connection to the surroundings of the evaporator heat exchanger, or the flow space forms the receiving space.

In a further embodiment, the at least one first flow channel is formed at a double disk wall and two disk walls of the double disk wall are connected to each other by the first and second integrally bonded connections. In this case, the disk walls can be connected directly to one another by the first and second integrally bonded connection, or the two double disk walls are connected to each other by the first and second integrally bonded connection and indirectly by means of a frame.

In particular, the evaporator heat exchanger comprises a housing and the at least one double disk wall is arranged within the housing, and the at least one second flow channel arranged within the housing is bounded by the housing and the at least one double disk wall.

The evaporator heat exchanger expediently comprises at least one exhaust gas flow channel, preferably a multiplicity of exhaust gas flow subchannels as at least one second flow channel, for the passage of exhaust gas for the outputting of heat from the exhaust gas to the working medium, and/or the evaporator heat exchanger is a plate heat exchanger, a spiral heat exchanger, a tubular heat exchanger or a shell and tube heat exchanger.

In a further refinement, the expansion machine is a turbine or a reciprocating piston engine.

In a further refinement, the system comprises a recuperator, by means of which heat can be transferred from the working medium after flowing through the expansion machine to the working medium upstream of the evaporator.

In an additional variant embodiment, the evaporator heat exchanger is at least partially, in particular completely, composed of stainless steel, since the working medium is conducted at a high pressure, for example within the range of between 40 and 80 bar, and the exhaust gas is conducted at a high temperature, for example in the region of approximately 600° C., through the evaporator heat exchanger.

An internal combustion engine according to invention in particular reciprocating piston internal combustion engine, with a system for using the waste heat of the internal combustion engine by means of the Clausius-Rankine cycle, comprising a circuit having lines with a working medium, in particular water, a pump for conveying the working medium, an evaporator which is heatable by the waste heat of the internal combustion engine and is intended for evaporating the liquid working medium, an expansion machine, a condenser for liquefying the vaporous working medium, and preferably a collecting and equalizing container for the liquid working medium, wherein the system is designed as a system described in this patent application, and/or the fluid conducted through the second flow channel is charge air, and therefore the evaporator heat exchanger is a charge air cooler or the fluid is exhaust gas, the evaporator heat exchanger thus preferably being an exhaust gas recirculation cooler.

In a further refinement, the waste heat of the main flow of exhaust gas of the internal combustion engine and/or the waste heat of the recirculation of exhaust gas and/or the waste heat of the compressed charge air and/or the heat of a coolant of the internal combustion engine is useable by the system as part of the internal combustion engine. The waste heat of the internal combustion engine is therefore converted by the system into mechanical energy and, as a result, the efficiency of the internal combustion engine is advantageously enhanced.

In a further refinement, the system comprises a generator. The generator can be driven by the expansion machine, and therefore the system can thus provide electric energy or electric current.

Expediently the sensor in the working space is, for example, a pressure system by which the exhaust gas pressure within the range of 3 to 4 bar can be detected or the pressure of the working medium within the range of between 20 and 40 bar can be detected.

In a further refinement, as the working medium of the system, use is made of water as pure substance, R245fa, ethanol (pure substance or mixture of ethanol with water), methanol (pure substance or mixture of methanol and water), longer chain C5 to C10 alcohols, longer chain C5 (pentane) to C8 (octane) hydrocarbons, pyridine (pure substance or mixture of pyridine with water), methyl pyridine (pure substance or mixture of methyl pyridine with water) trifluoroethanol (pure substance or mixture of trifluoroethanol with water), hexafluorobenzene, a water/ammonia solution and/or a water/ammonia mixture.

Exemplary embodiments of the invention are described in more detail below with reference to the attached drawings, in which:

FIG. 1 shows a greatly simplified illustration of an internal combustion engine with a system for using the waste heat of the internal combustion engine, FIG. 2 shows a view of an evaporator heat exchanger in a first exemplary embodiment, FIG. 3 shows a view of the evaporator heat exchanger in a second exemplary embodiment, FIG. 4 shows a section of the evaporator heat exchanger in a third exemplary embodiment, FIG. 5 shows a perspective partial view of the evaporator heat exchanger according to FIG. 4, FIG. 6 shows a view of the evaporator heat exchanger in a fourth exemplary embodiment, FIG. 7 shows a section of the evaporator heat exchanger according to FIG. 6 with a frame in a first variant embodiment, and FIG. 8 shows a section of the evaporator heat exchanger according to FIG. 6 with the frame in a second variant embodiment.

FIG. 9 shows a schematic view of an evaporator heat exchanger according to a further exemplary embodiment.

An internal combustion engine 8 in the form of a reciprocating piston internal combustion engine 9 serves for driving a motor vehicle, in particular truck, and comprises a system 1 for using the waste heat of the internal combustion engine 8 by means of the Clausius-Rankine cycle. The internal combustion engine 8 has an exhaust gas turbocharger 17. The exhaust gas turbocharger 17 compacts fresh air 16 into a charge air line 13, and a charge air cooler 14 installed in the charge air line 13 cools the charge air before feeding the latter to the internal combustion engine 8. Some of the exhaust gas from the internal combustion engine 8 is conducted away by an exhaust gas line 10 and is subsequently cooled in an evaporator heat exchanger 4 as an exhaust gas recirculation cooler and is added by an exhaust gas recirculation line 15 to the fresh air fed to the internal combustion engine 8 by the charge air line 13. Another portion of the exhaust gas is conducted into the exhaust gas turbocharger 17 in order to drive the exhaust gas turbo charger 17 and is subsequently output in the form of exhaust gas 18 to the surroundings. The system 1 has lines 2 with a working medium. An expansion machine 5, a condenser 6, a collecting and equalizing container 7 and a pump 3 are integrated in the circuit with the working medium. The liquid working medium is raised by the pump 3 to a higher pressure level in the circuit and the liquid working medium is subsequently evaporated in the evaporator heat exchanger 4 and then mechanical work is performed in the expansion machine 5 by the gaseous working medium expanding and subsequently having a low pressure. The gaseous working medium is liquefied in the condenser 6 and is subsequently fed again to the collecting and equalizing container 7.

FIG. 2 illustrates a first exemplary embodiment of the evaporator heat exchanger 4. The evaporator heat exchanger 4 has an inlet opening 32 for conducting the working medium into, and an outlet opening 33 for discharging the working medium from, the evaporator heat exchanger 4. A first flow channel 19 (not illustrated in FIG. 2) is formed between a multiplicity of double disk walls 29. The double disk walls 29 each have an upper disk wall 30 and a lower disk wall 31. Spacers 39 are arranged in each case at the inlet and outlet openings 32, 33 between the double disk walls 29. In this case, a meandering channel (not illustrated) is incorporated into the lower disk wall 31, and therefore a meandering first flow channel 19 is formed between the upper and lower disk walls 30, 31, with the working medium being conducted through said flow channel from the inlet opening 32 to the outlet opening 33. In this case, the upper and lower disk walls 30, 31 are connected to each other by means of an integrally bonded connection 23 as the first integrally bonded connection 24, namely a brazed joint 26 (not illustrated). Furthermore, the upper and lower disk walls 30, 31 each have a passage opening 44 at the inlet and outlet openings 32, 33 such that, as a result, the working medium can also flow through the double disk walls 29 to double disk walls 29 located therebelow or thereabove at the spacers 39

(analogously to FIG. 6). The spacers 39 also each have a passage opening 41 (analogously to FIG. 6). Four pipes of rectangular cross section which are formed by a pipe wall 28 in the form of the wall 27 are arranged between the double disk walls 29. The pipes of rectangular cross section form a second flow channel 20 for the passage of exhaust gas or charge air such that heat is transmitted by the exhaust gas or the charge air to the working medium and, as a result, the working medium evaporates in the evaporator heat exchanger 4. The pipe walls 28 therefore constitute a second limiting component 22 forming the second flow channel 20. The pipes for the passage of the exhaust gas or the charge air have a slightly greater length than the double wall disks 29 at both ends, and therefore the pipes which are formed by the pipe walls 28 protrude slightly beyond a gas-side border of the double disk walls 29. A base 37 has diffuser openings 46 of rectangular cross section. The base 37 is connected in an integrally bonded manner at the diffuser openings 46 to the pipes, i.e. is brazed onto the latter. In this case, the base 37 is at a distance from the double disk walls 29 because the pipes are extended with respect to the gas-side border of the double disk walls 29 and the base 37 is soldered to the pipes at the outermost end of the pipes. A gas diffuser 38 (only illustrated by dashed lines in FIG. 2) which has an inlet opening 11 for conducting in the exhaust gas or the charge air is arranged on the base 37. In FIG. 2, the base 37 as an exploded illustration is not yet fastened to the pipes. A second base 37 with the gas diffuser 38 (not illustrated) is likewise arranged in analogous manner at the other end of the pipes, which end is illustrated further to the rear in FIG. 2. In this case, the brazed joint 26 as an integrally bonded connection 23 or as the second integrally bonded connection 25 of the base 37 to the pipes likewise constitutes a second limiting component 26 of the second flow channel 20. In the event of leakage at said brazed joint 26 between the base 37 and the pipes, the fluid conducted through the second flow channel 20, for example charge air or exhaust gas, directly enters the flow space 35 as the surroundings and therefore the fluid emerging from the second flow channel 20 in the event of leakage at the brazed joint 26 cannot enter the first flow channel 19.

The upper and lower disk walls 30, 31 are connected to each other by means of the integrally bonded connection 23 as the first integrally bonded connection 24 (see above), i.e. the brazed joint 26 (not illustrated). The brazed joint 26 between the upper and lower disk walls 30, 31 and the upper and lower disk walls 30, 31 therefore constitute a first limiting component 21 which form or bound the first flow channel 19. In the event of leakage at the brazed joint 26 between the upper and lower disk walls 30, 31, the working medium does not directly enter the second flow channel 20 because of the distance of the base 37 from the double disk walls 29 but rather enters the flow space 35 as the surroundings of the evaporator heat exchanger 4.

FIG. 3 illustrates a second exemplary embodiment of the evaporator heat exchanger 4. Essentially only the differences over the first exemplary embodiment according to FIG. 2 are described below. Only one pipe of rectangular cross section instead of four pipes of rectangular cross section is arranged between the double disk walls 29, and a ribbed structure 34 is arranged within the pipe. In analogous manner to the first exemplary embodiment, the single pipe between the double disk walls 29 has a greater length at both ends or an extension with respect to the ends or the gas-side border sides of the double disk walls 29. In an analogous manner to the first exemplary embodiment, a base 37 (not illustrated) having diffuser openings 46 and also a gas diffuser 38 are each fastened to said pipes at a distance from the double disk walls 29. This applies to both ends of the pipes according to the exemplary embodiment in FIG. 3. In this case, both in the first and in the second exemplary embodiment, the evaporator heat exchanger has a multiplicity of double disk walls 29 arranged one above another and pipes arranged in-between. This is only partially illustrated in FIGS. 2 and 3.

FIGS. 4 and 5 illustrate a third exemplary embodiment of the evaporator heat exchanger 4. A multiplicity of double disk walls 29 are arranged one above another, and each of the double disk walls 29 consists of an upper disk wall 30 and a lower disk wall 31. In this case, the upper disk wall 30 is soldered to the lower disk wall 31 by means of an integrally bonded connection 23, namely the brazed joint 26. FIG. 4 illustrates a section through the brazed joint 26. In this case, a meandering first flow channel 19 is incorporated into the lower disk wall 31. As a result, the working medium is conducted through the meandering first flow channel and, at the inlet opening 32, enters the evaporator heat exchanger 4 and leaves the evaporator heat exchanger at the outlet opening 33. In an analogous manner to the first and second exemplary embodiments, the spacer 39 is arranged between the double disk walls 29 in each case at the inlet and outlet openings 32, 33 on two sides of the double disk walls 29, and therefore working medium can be conducted into and discharged from the multiplicity of double disk walls 29 arranged one above another by the first flow channel 19. In this case, the double disk walls 29 each have passage openings 44 through which the working medium can be conducted. In an analogous manner, the spacers 39 also have the passage openings 41. In contrast to the first and second exemplary embodiments, only a ribbed structure 34 (not illustrated) rather than a pipe is arranged between the double disk walls 29. The multiplicity of double disk walls 29 with the ribbed structures 34 arranged in-between are arranged within a housing (not illustrated in FIGS. 4 and 5). In this case, the housing is fluid-tight and constitutes the second limiting component 22 for the exhaust gas or the charge air. In this case, the housing has an inlet opening and outlet opening, through which the exhaust gas is conducted into and discharged from the space enclosed by the housing. As a result, owing to the arrangement of the double disk walls 29 within a space enclosed by the housing, the fluid, for example charge air or exhaust gas, can also transfer heat around and between the double disk walls 29 to the working medium owing to the flow around the double disk walls 29.

The brazed joint 26 between the upper and lower disk walls 30, 31 is divided into a first integrally bonded connection 24 and into a second integrally bonded connection 25, and, between the first integrally bonded connection 24 and the second integrally bonded connection 25, a flow space 35 is therefore formed between the upper and lower disk walls 30, 31 as a leakage channel 36. In this case, the second integrally bonded connection 25 constitutes a second limiting component 22 for the second flow channel 20 and the first integrally bonded connection 24 constitutes a first limiting component 21 for the first flow channel 19. In the event of a leakage at the first integrally bonded connection 24 which bounds the first flow channel 19, the working medium therefore enters the leakage channel 36 and is guided by leakage passage openings 40 in the spacer 39 to a leakage outlet opening 42 in the evaporator heat exchanger 4. In this case, the leakage outlet opening 42 leads outside the housing (not illustrated) of the evaporator heat exchanger 4 into the surroundings of the evaporator heat exchanger 4. As a result, in the event of a leakage at the first integrally bonded connection 24 in the form of a brazed joint 26, working medium does not enter the second flow channel 20 and, as a result, working medium also does not enter the combustion air of the internal combustion engine 8. In analogous manner, in the event of a leakage at the second integrally bonded connection 25, the fluid, for example charge air or exhaust gas, flows into the leakage channel 36 and through the leakage passage openings 40 to the leakage outlet opening 42 which is in fluid-conducting connection with the surroundings of the evaporator heat exchanger 4.

In a departure therefrom, the leakage outlet opening 42 can also be closed such that the flow space 35 constitutes a closed, fluid-tight receiving space for the working medium or the fluid. Either a pressure sensor 47 (see FIG. 9) or a sensor for detecting working medium or exhaust gas or charge air is arranged within the receiving space closed in a fluid-tight manner. A leakage or leakiness, for example due to a rise in the pressure in the receiving space or to an increase of certain gases, for example working medium or exhaust gas, can therefore be detected by the pressure sensor or the sensor and the system 1 can be switched off by means of a control unit (not illustrated) of the system or of the internal combustion engine 8 in order to prevent working medium from flowing into the combustion air fed to the internal combustion engine 8.

As already described, two spacers 39 are arranged in each case between the double disk walls 29. In the event of a leakage at the brazed joint 26 between the spacer 39 and the upper and/or lower disk wall 30, 31 of different double disk walls 29 working medium could enter the space enclosed by the housing (not illustrated). In order to prevent this, a leakage ring 36*a* (illustrated in FIG. 4*a*) is formed on the upper and lower side of the spacer 39, said leakage ring completely surrounding the passage opening 41 and leading into the leakage passage opening 40. As a result, a first and second integrally bonded connection 24, 25 is also formed at the integrally bonded connection 23 between the spacer 39 and the upper and lower disk walls 30, 31, and therefore, in an analogous manner, in the event of a leakage at the integrally bonded connection 23 between the spacer 39 and the lower and upper disk walls 30, 31, the working medium or the fluid can be discharged into the leakage passage opening 40 in the spacer 39 and therefore also out of the leakage outlet opening 42 or the flow space 35 constitutes the receiving space. The leakage ring 36*a* therefore likewise constitutes a leakage channel 36 within the context of the invention.

FIGS. 6 to 8 illustrate a fourth exemplary embodiment of the evaporator heat exchanger 4. In an analogous manner to the second exemplary embodiment according to FIG. 3, a multiplicity of double disk walls 29 with an upper and a lower disk wall 30, 31 are connected to one another and arranged one above another. In this case, the upper disk wall 30 is indirectly connected by an encircling frame 43 to the lower disk wall 31 by the brazed joint 26. As a result, a first flow channel 19 is formed in each case between the upper and lower disk walls 30, 31. A spacer 39 with the passage opening 41 is arranged in each case between the double disk walls 29 such that the working medium can be conducted into and discharged from the multiplicity of double disk walls 29 arranged one above another on account of the passage openings 44 in the upper and lower disk walls 30, 31. The ribbed structure 34 is arranged between the lower disk wall 31 and the upper disk wall 30 of two different double disk walls 29, and a second flow channel 20 for the fluid is formed in each case between two double disk walls 29 by a frame 43 between said upper disk wall 30 and the lower disk wall 31. A disk wall 30, 31 therefore constitutes both a first limiting component 21 for the first flow channel 19 and a second limiting component 22 for the second flow channel 20. The frame 43 as the second limiting component 22 is arranged on the narrow sides of the upper and lower disk walls 30, 31 and is therefore in two parts (FIG. 6). A gas diffuser 38 is arranged in each case on the gas-side border of the double disk walls 29. In this case, the gas diffuser 39 is brazed directly in a fluid-tight manner onto the two ends of the double disk walls 29 stacked one above another. In this case, two gas diffusers 38 are in each case arranged between the double disk walls 29 both for letting the fluid into the second flow channel 20 and for letting the fluid out of the latter, wherein only one gas diffuser 38 on the left is partially illustrated in FIGS. 7 and 8 and the gas diffuser 38 on the right is not illustrated in FIGS. 7 and 8.

The components of the evaporator heat exchanger 4, for example the double disk walls 29, the ribbed structure 34, the gas diffuser 38 or the spacer 39, for example consisting stainless steel or aluminum, are connected to one another by the integrally bonded connection 23, in particular the brazed connection 26 or an adhesive connection. In this case, the integrally bonded connection 23 constitutes the weak point of the first and second limiting components 21, 22. The frame 43 between the upper and lower disk walls 30, 31 is designed here in the region of the gas-side end of the double disk walls 29, i.e. at the region enclosed by the gas diffuser 38, as a part 45. FIGS. 7 and 8 illustrate a section through the evaporator heat exchanger 4 in the region of the part 45. In the variant embodiment illustrated in FIG. 7, the part 45 is in two parts, and therefore a flow space 35 is formed as leakage channel 36 on the part 45. Therefore, in the variant embodiment according to FIG. 7 or 8, a first integrally bonded connection 24 and a second integrally bonded connection 25 are formed on the part 45 in an analogous manner to the third exemplary embodiment according to FIGS. 4 and 5. In the event of leakiness at the first integrally bonded connection 24, the working medium can therefore be conducted into the flow space 35 or leakage channel 36 or, if a leakage outlet opening 42 (not illustrated) is sealed, can be conducted into the receiving space as the flow space 35. Therefore, in the event of a leakage at the first integrally bonded connection 24, the working medium can be discharged into the surroundings and/or leakiness at the first integrally bonded connection 24 can be detected by means of a sensor. The same applies in an analogous manner for a leakage at the second integrally bonded connection 25. The variant embodiment of the part 45 of the frame 43 that is illustrated in FIG. 8 differs merely in that the part 45 is a single part and, owing to the geometry thereof, an upper and lower leakage channel 36 are formed on the part 45 or a receiving space is formed thereon as the upper and lower receiving space between the upper and lower disk walls 30, 31.

When considered overall, substantial advantages are associated with the system 1 according to the invention. In the evaporator heat exchanger 4 for transferring heat from the fluid, for example exhaust gas or charge air, to the working medium, the brazed joints 26 constitute the critical points or weak points. In this case, there is no direct connection in the evaporator heat exchanger 4 of the first flow channel 19 to the second flow channel 20 or vice versa at the brazed joints 26. Two separate first and second integrally bonded connections 24, 25 are respectively formed for the first and the second flow channels 19, 20, and working medium or fluid escaping between said two separate integrally bonded connections 23 can be conducted either into the surroundings or into a closed receiving space for the detection of leakage by means of a sensor.

LIST OF REFERENCE NUMBERS

1 System
2 Line
3 Pump
4 Evaporator heat exchanger
5 Expansion machine
6 Condenser
7 Collecting and equalizing container
8 Internal combustion engine
9 Reciprocating piston internal combustion engine
10 Exhaust gas line
11 Inlet opening
12 - - -
13 Charge air line
14 Charge air cooler
15 Exhaust gas recirculation line
16 Fresh air
17 Exhaust gas turbocharger
18 Exhaust gas
19 First flow channel
20 Second flow channel
21 First limiting component
22 Second limiting component
23 Integrally bonded connection
24 First integrally bonded connection
25 Second integrally bonded connection
26 Brazed joint
27 Wall
28 Pipe wall
29 Double disk wall
30 Upper disk wall
31 Lower disk wall
32 Inlet opening
33 Outlet opening
34 Ribbed structure
35 Flow space
35 Leakage channel
36a Leakage ring
37 Base
38 Gas diffuser
39 Spacer
40 Leakage passage opening in spacer
41 Passage opening in spacer
42 Leakage outlet opening
43 Frame
44 Passage opening
45 Part of the frame
46 Diffuser opening
47 Pressure sensor

The invention claimed is:

1. An evaporator heat exchanger for evaporating a working medium comprising:
a housing,
a plurality of double disk walls, wherein each double disk wall comprises an upper disk wall and a lower disk wall in direct contact with one another, wherein the upper disk wall and the lower disk wall are directly connected to one another by a first integral bond, wherein each double disk wall comprises a first inlet and a first outlet, wherein a first flow channel flows through each double disk wall from the first inlet, through a flow path formed by and between the upper disk wall and the lower disk wall, and to the first outlet,
a plurality of spacers, wherein each spacer is arranged between two adjacent double disk walls in the region of the first inlet opening and the first outlet opening, wherein each spacer comprises a passage opening which connects the first inlets or the first outlets of adjacent double disk walls,
a plurality of pipes forming a second flow channel, wherein each pipe is arranged between two adjacent double disk walls in a region between the first inlet opening and the first outlet opening, wherein the plurality of pipes have a greater length than the adjacent upper disk wall and the lower disk wall, wherein a base is arranged at an end region of each pipe and a diffuser is arranged on the base, wherein the pipes, the base, and the diffuser are connected by a second integral bond,
a surroundings which is external to a housing of the evaporator heat exchanger,
wherein in the event of a leak in the second flow channel, a fluid in the second flow channel is prevented from entering the first flow channel,
wherein in the event of a leak in the first flow channel, a fluid in the first flow channel is prevented from entering the second flow channel.

2. A system for an internal combustion engine which utilizes waste heat of the internal combustion engine by employing a Clausius-Rankine cycle, the system comprising:
a fluid circuit comprising a working medium,
a pump for conveying the working medium,
a warm fluid flow path comprising a warm fluid,
an evaporator heat exchanger according to claim 1, wherein the warm fluid evaporates the working medium in the evaporator heat exchanger,
an expansion machine for converting heat energy to mechanical work,
a condenser for liquefying working medium in a vaporous state,
and a collecting and equalizing container for working medium in a liquid state.

3. The system of claim 2,
wherein the pump is configured to pressurize the working medium to a range of 40 to 80 bar.

4. The system of claim 2,
wherein the working medium is selected from the group consisting of: substantially pure water, R245fa, ethanol, methanol, longer chain $C_5$ to $C_{10}$ alcohols, longer chain $C_5$ to $C_8$ hydrocarbons, pyridine, methyl pyridine, trifluoroethanol, hexafluorobenzene, ammonia, or mixtures thereof.

5. The system of claim 4,
wherein the working medium is water and the warm fluid is exhaust gas.

6. The system of claim 2,
wherein the expansion machine is a turbine or reciprocating piston engine.

7. The system of claim 2,
further comprising a recuperator configured to transfer heat from the working medium after flowing through the expansion machine to the working medium upstream of the evaporator heat exchanger.

8. The system of claim 2,
further comprising an electric generator configured to be driven by the expansion machine.

9. The evaporator heat-exchanger according to claim 1, wherein the first flow channel comprises a meandering channel bounded by the upper disk wall and the lower disk wall, wherein each double disk wall further comprises a third integral bond, wherein the first integral bond, the third integral bond, the upper disk wall, and the lower disk wall bound a first leakage channel for receiving leaks from the first flow channel, wherein the first leakage channel essentially surrounds the first flow channel, wherein:
(a) the first leakage channel is connected to leakage passage openings in the spacer, wherein the leakage passage openings are connected to a leakage outlet opening leading outside the housing,
or
(b) the first leakage channel is connected to leakage passage openings in the spacer, wherein the leakage passage openings are not connected to a leakage outlet opening such that the first leakage channel is fluid-tight, wherein the first leakage channel comprises a sensor for detecting the fluid or for detecting a change in pressure or temperature in the first flow channel.

10. The evaporator heat exchanger according to claim 9, wherein an upper side and a lower side of each spacer comprises a leakage ring encircling the passage opening in the spacer, wherein the leakage ring is connected to a leakage passage leading to the outside of the housing.

11. The evaporator heat exchanger according to claim 9, wherein (a) the first leakage channel is connected to leakage passage openings in the spacer, wherein the leakage passage openings are connected to a leakage outlet opening leading outside the housing.

12. The evaporator heat exchanger according to claim 9, wherein (b) the first leakage channel is connected to leakage passage openings in the spacer, wherein the leakage passage openings are not connected to a leakage outlet opening such that the first leakage channel is fluid-tight, wherein the first leakage channel comprises a sensor for detecting the fluid or for detecting a change in pressure or temperature in the first flow channel.

13. The evaporator heat exchanger according to claim 1, wherein a ribbed structure or a turbulence insert is arranged between the upper disk wall and the lower disk wall of each double disk wall.

14. The evaporator heat exchanger according to claim 1, wherein the evaporator heat exchanger is manufactured at least partially from stainless steel.

* * * * *